United States Patent [19]

Mesnel et al.

[11] Patent Number: 4,989,315
[45] Date of Patent: Feb. 5, 1991

[54] METHOD OF MANUFACTURING A SEALING AND GUIDING ELEMENT

[75] Inventors: Gerard Mesnel, Carrieres-sur-Seine; Francois Mesnel, Neuilly-sur-Seince, both of France

[73] Assignee: Mesnel S.A., Carrieres-sur-Seine, France

[21] Appl. No.: 388,057

[22] Filed: Aug. 1, 1989

Related U.S. Application Data

[60] Division of Ser. No. 225,161, Jul. 28, 1988, Pat. No. 4,947,586, which is a continuation-in-part of Ser. No. 24,527, Mar. 11, 1987, Pat. No. 4,843,763, which is a continuation-in-part of Ser. No. 885,731, Jul. 21, 1986, which is a continuation of Ser. No. 612,178, May 21, 1984, abandoned.

[30] Foreign Application Priority Data

Nov. 25, 1987 [FR] France ............................... 87 16334

[51] Int. Cl.⁵ .............................................. B21B 1/46
[52] U.S. Cl. ..................................... 29/527.2; 49/491
[58] Field of Search .................... 29/527.2, 527.4, 412, 29/416; 264/135; 49/248, 440, 448, 491

[56] References Cited

U.S. PATENT DOCUMENTS 4,719,892  1/1988  Lopez-Crevillen ............... 123/198
4,783,931  11/1988 Kirkwood ............................ 49/441
4,843,763  7/1989  Mesnel ................................. 49/440

Primary Examiner—Howard N. Goldberg
Assistant Examiner—S. Thomas Hughes
Attorney, Agent, or Firm—Foley & Lardner, Schwartz, Jeffery, Schwaab, Mack, Blumenthal & Evans

[57] ABSTRACT

The sealing and guiding element comprises an extruded elastomer with metal backing which includes a first U-shaped part forming a grip, suitable to be fitted on the frame of the movable window and a second U-shaped part turned the opposite way round to the first part and acting as a guiding and weathersealing member for the movable window. The first and second parts are joined together by a flexible resilient hinge contained in the elastomer without metal backing. The hinge permits a dual freedom of movement to the second part, on the one hand pivoting in relation to the said first part and, on the other hand, in translation substantially in the plane of movement of the movable window.

2 Claims, 2 Drawing Sheets

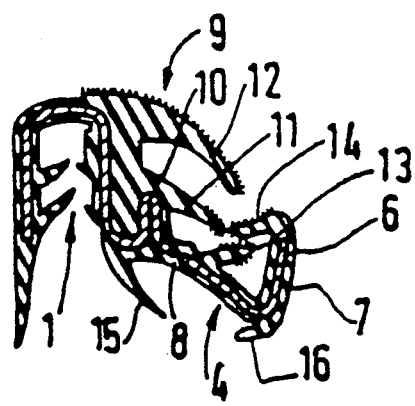
FIG.1
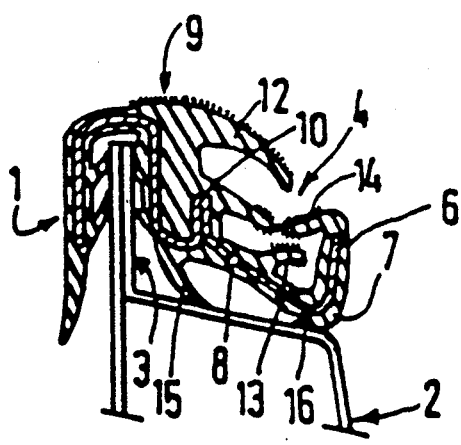
FIG.2
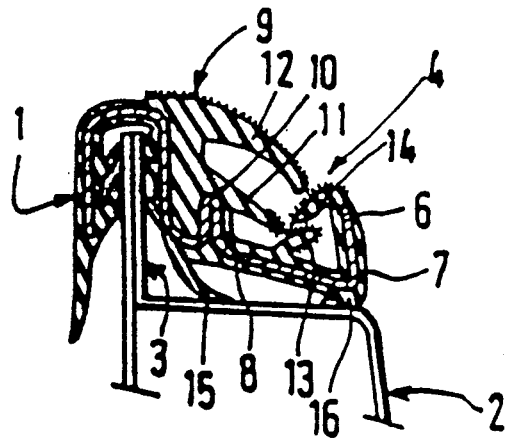
FIG.3
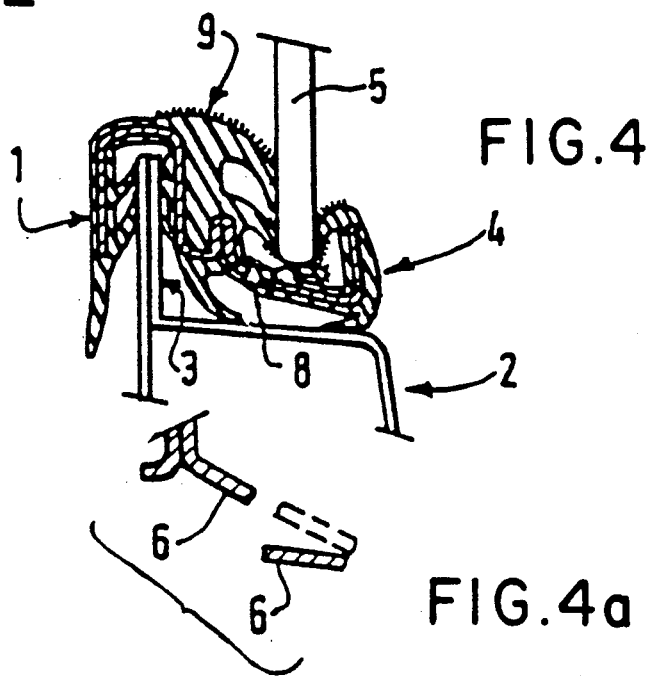
FIG.4
FIG.4a

METHOD OF MANUFACTURING A SEALING AND GUIDING ELEMENT

CROSS REFERENCE TO RELATED APPLICATIONS

This application is a division of application Ser. No. 225,161, filed July 28, 1988, U.S. Pat. No. 4,947,586, which is a continuation-in-part of U.S. application Ser. No. 024,527, filed Mar. 11, 1987, U.S. Pat. No. 4,843,763 which is a continuation-in-part of U.S. application Ser. No. 885,731, filed July 21, 1986, which in turn is a continuation of U.S. application Ser. No. 612,178, filed May 21, 1984, now abandoned.

BACKGROUND OF THE INVENTION

The present invention concerns a rolled section designed to ensure the guiding and weathersealing of a movable window, notably for an automobile door. More particularly, it concerns a rolled section of this type designed to fit a automobile door having a window of the flush type.

SUMMARY OF THE INVENTION

An object of the present invention is to provide an improved guiding and sealing strip for a flush glass window.

Another object of the invention is to provide a manufacturing process for the improved guiding and sealing strip for a flush glass window.

Application Ser. No. 024,527, filed Mar. 11, 1987 is incorporated herein by reference and discloses a sealing and guiding element with an extruded elastomer on a rolled section forming a bonded metal backing. The sealing and guiding element has a first part having a "U" shape designed to be attached to the frame of a slidable window and a second part having a "U" shape which is called a "run channel" and acts as a guiding and weathersealing member for the movable window. A third part having a "U" shape is rigidly integral with the first part between the first and second parts. The third part may receive an additional rolled section forming a weatherseal of the type called a "belt tight sliding weatherstrip." At least one lip of the belt wheatherstrip slides smoothly against the outside face of the window in its closed position. This belt sliding weatherstrip may be a separate piece in the form of a rolled section, as discussed above, or it may be integral with the first and second parts.

The first part forming the grip and the second part forming the guiding member are articulated between each other by a resilient hinge. This hinge is made by bending the center part of the rolled section metal backing before the extrusion of the elastomer on the backing. This bent piece is then cut out after the extrusion so that the backing is eliminated. A fraction of the elastomer remains in this portion which forms the connecting hinge.

This hinge permits a certain degree of freedom between the two parts of the rolled section which it joins, which thus may pivot one in relation to the other. The hinge enables the sealing and guiding element to be adapted to frames having different angles of opening and to ensure an excellent weathersealing of the movable window when in the closed position, without imposing excessive stresses on it.

Furthermore, a part of the backing of the center portion cut out of the rolled section remains, forming two arms of the "U" shaped parts designed to receive respectively, on the one hand, the movable window and, on the other hand, the belt rubbing weatherstrip, if this has not been extruded with the rolled section.

This sealing and guiding element, therefore, has substantial advantages over prior devices.

The present invention is an improvement on this basic invention having functional advantages over the earlier one and capable of being made by a process much easier to implement. More precisely, the present invention provides a variation of the sealing and guiding element disclosed in aforementioned U.S. application Ser. No. 024,527 in which the resilient hinge permits not only a relative pivoting of the parts of the rolled section which it joins, but also a translational movement of the run channel substantially in the plane of movement of the window.

Accordingly, another object of the present invention is to offer a process of manufacture of such a rolled section which is simple and does not involve a cutting out a portion of the bridge piece joining the part forming the run channel and the part forming grip of the rolled section after extrusion of the elastomer.

In accordance with the above objects, the present invention is a sealing and guiding element for a movable window, particularly for an automobile door, formed of an extruded elastomer with metal backing and comprising a first "U" shaped part forming a grip suitable to be fixed on the frame of the window and a second "U" shaped part turned the opposite way round to the said first part and acting as guiding and weathersealing member for the movable window. These first and second parts are joined together by a flexible resilient hinge formed in the elastomer without metal backing. The positioning and structure of the hinge is such that it permits a dual freedom of movement to the second part: on the one hand, pivoting in relation to the first part, and on the other hand, translational movement substantially in the plane of movement of the window.

The present invention also includes a process of manufacture of such a sealing and guiding element wherein a metal strip designed to form the backing is made in the appropriate shape, the strip is cut longitudinally in two fractions at a location corresponding to that of the flexible resilient hinge and the elastomer is extruded simultaneously on the two fractions of the strip in appropriate adjacent positions. The strip is coated beforehand with a bonding agent for the elastomer on the metal of the said strip. This coating may be carried out before or after the forming of the metal strip.

During a flow production using such a process, the cutting of the metal strip will be carried out immediately before the extrusion of the elastomer, which will cover the assembly of both portions of strip to make a single sealing and guiding element comprising the articulating hinge and the belt rubbing weatherstrips.

The translational movement of the run channel acting as guiding member for the movable window will occur at the end of movement of the window, when it reaches the closed position. The window edge pushes this part back in the direction of the part adjacent to the frame, with a simultaneous pivoting movement in relation to the part forming the grip, which ensures an enhanced weathersealing of the window, at the same time making its movements easier.

As in the previous sealing and guiding elements of this type, the drop glass belt rubbing weatherstrip could form either an independent member, added onto the rolled section and seated in a "U" section part with an opening turned the opposite way round to that of the part forming grip, with which it is rigidly integral, or form an integral part of the rolled section and being extruded with it.

The rolled section conforming to the invention is suitable for equipping the framed openings of automobile doors just as well in the case where these frames have curvilinear rolled sections with adapted radiused corners as for rolled sections with sharp corners. In this latter case, cutouts of V section could be made in the parts of the rolled section corresponding to the corners of the frame, so as to be able to curve the rolled section easily and to make it easy to fit in position.

BRIEF DESCRIPTION OF THE DRAWINGS

Other characteristics of the invention will become more readily apparent as the invention becomes more fully understood from the description which will follow, reference will be made to the attached drawings, in which:

FIG. 1 is a cross-section of the sealing and guiding element of the present invention;

FIG. 2 is a cross-section illustrating the adaptability of the present invention to a first window frame;

FIG. 3 is a cross-section illustrating the adaptability of the present invention to a second window frame;

FIG. 4 illustrates the distortion of the sealing and guiding element of the present invention under the stress of a movable window;

FIG. 4a is a magnified view of a portion of FIG. 4;

DETAILED DESCRIPTION OF THE PREFERRED EMBODIMENTS

Figure 5:
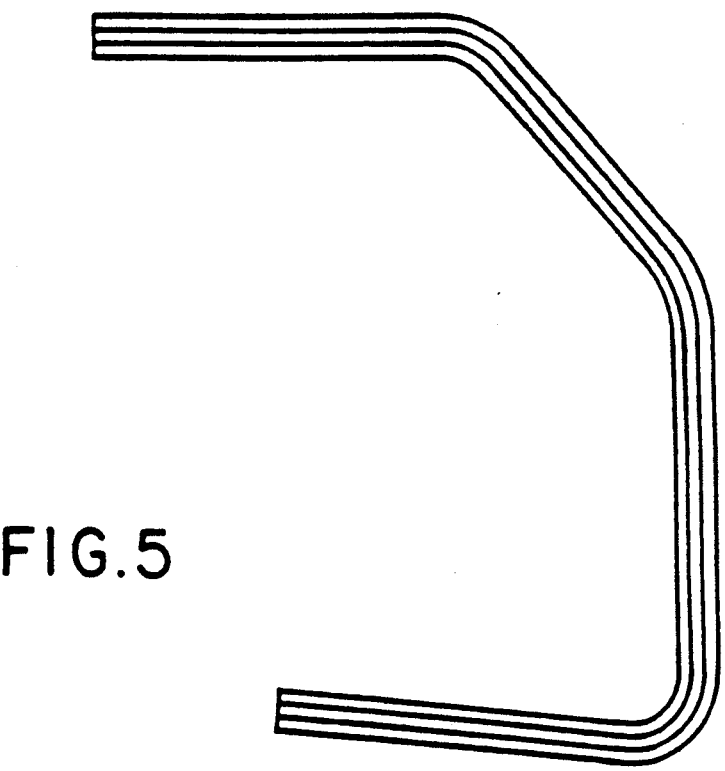
FIG. 5 illustrates the use of the sealing and guiding element of the present invention for equipping frames having curvilinear corners.

Reference will be made first of all to FIGS. 1 to 4 in which the sealing and guiding element shown is a one piece rolled section. That is to say, the belt sliding weatherstrip is an integral part of it. As indicated above, the belt rubbing weatherstrip could just as well be a separate additional rolled section, set in a groove of the sealing and guiding element conforming to the invention.

As indicated in U.S. application Ser. No. 024,527, this sealing and guiding element comprises a first "U" shaped part 1, forming a grip, designed to be made integral with the frame 2 of an automobile door by covering this frame at a fillister 3. This part 1 is attached to a second "U" shaped part or run channel 4, acting as a guiding and weathersealing member for a movable window 5. The "U" shaped parts 1 and 4 are reversed one in relation to the other.

Conforming to the invention, the grip 1 and the run channel 4 both comprise a metal backing 6, for example in aluminum, sheathed with an elastomer 7 and are joined by a hinge 8 between them in the elastomer, but without backing. As described in the aforementioned U.S. application Ser. No. 024,527, this hinge 8 permits, on the one hand, a pivoting of the run channel 4 in relation to the grip 1, and on the other hand, at the end of travel of the window 5 when it rests on the bottom of the run channel 4 (see part in much larger scale in FIG. 4), a translation of the run channel 4 in relation to the grip 1 in a direction substantially parallel to the plane of movement of the window 5.

Furthermore, the sealing and guiding element comprises a weathersealing component or belt rubbing weatherstrip 9 bordering the grip 1. A curved part 10 of the metal backing 6 is fastened to this weatherstrip 9. Two lips, 11 and 12, of this belt sliding weatherstrip, comprising flocked fibers on their surface, come into contact with the inside face of the window 5, when this is in the closed position, whereas the two run channel lips, 13 and 14, also flocked, bordering respectively on the bottom and the lateral strip opposite the belt sliding weatherstrip 9, ensure respectively the weathersealing level with the edge of the movable window 5 and on the outside face of it. Two other lips, respectively 15 and 16, protrude from the bottom of the run channel in the direction of the frame 2, dampen the movement of the sealing and guiding element when this is pushed by the movable window 5 and ensure the weathersealing at this level.

Such a sealing and guiding element and its flexible articulation 8 are made by precoating a 1 mm thick continuous strip of metal, for example, of aluminum, designed to form the backing, with an elastomer-to-metal bonding agent, which is then folded into the desired shape with the help of a system of rollers. The metal strip is cut using trimming shears along a line corresponding to the location of the hinge 8 just before the strip thus shaped is inserted into the extruding head which will cover it with an elastomer of the desired profile making the belt rubbing weatherstrip and the various lips simultaneously.

Figure 6:
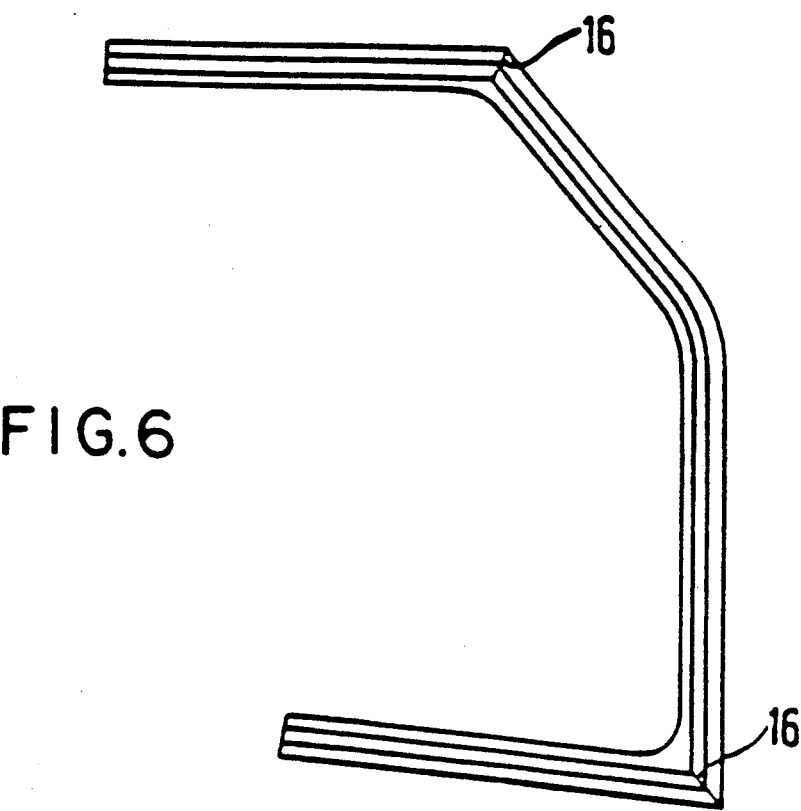
FIG. 6 illustrates the use of the sealing and guiding element of the present invention for equipping frames having sharp corners.

After the extrusion of the elastomer, the resulting sealing and guiding element is prevulcanized, coated with fiber tufting on the locations designed to come into contact with the movable window 5 and cut into rudimentary rectilinear sections, which are then formed in the profile of the door frames to be fitted, whether these have rounded corners, as may be seen in FIG. 5, or sharp corners, as in FIG. 6. In this latter case, the sealing and guiding element could comprise V cutouts, 16, in the corners, to aid the installation of the sealing and guiding element on the frame.

In addition to achieving the same advantages as the sealing and guiding element described in U.S. application Ser. No. 024,527, the present sealing and guiding element is distinguished by a much greater ease of manufacture, and, in consequence, by a lower cost, and by a greater flexibility at the level of the edge of the movable window, so that enhanced weathersealing is obtained. A similar sealing and guiding element, conforming to the present addition, could adapt to door frames having very different angles of opening, as shown in FIGS. 2 and 3, because of its great flexibility.

The foregoing description is set forth for the purpose of illustrating the present invention but is not intended to limit the scope thereof. Clearly, numerous additions, substitutions and other modification could be made to the invention without departing from the scope thereof as set forth in the appended claims.

What is claimed is:

1. A manufacturing process for a sealing and guiding element comprising:
   shaping a metal strip to form a backing having a first generally U-shaped portion for holding said sealing and guiding element in place on a flange, and a second generally U-shaped portion for guiding a window, said second generally U-shaped portion having a base;

cutting said metal strip longitudinally in two fractions in said base at a location corresponding to a desired flexible resilient hinge; and extruding a elastomer simultaneously onto the two fractions of the strip such that the elastomer joins one fraction to the other, thereby forming a hinge at said location.

2. A manufacturing process for a sealing and guiding element according to claim 1 including coating said metal strip with a bonding agent for said elastomer before extruding said elastomer on said metal strip.

* * * * *